United States Patent
Labarge et al.

(10) Patent No.: US 6,887,438 B2
(45) Date of Patent: May 3, 2005

(54) $NO_X$ CONTROL

(75) Inventors: William J. Labarge, Bay City, MI (US); Joachim Kupe, Davisburg, MI (US); Galen Bruce Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 808 days.

(21) Appl. No.: 09/745,849

(22) Filed: Dec. 21, 2000

(65) Prior Publication Data
US 2002/0081242 A1 Jun. 27, 2002

(51) Int. Cl.⁷ ............................. B01D 5/00; B01D 52/34
(52) U.S. Cl. ............................ 422/177; 422/168
(58) Field of Search ........................ 422/177, 168, 422/179, 181

(56) References Cited

U.S. PATENT DOCUMENTS

| | | | | |
|---|---|---|---|---|
| 3,701,822 A | * | 10/1972 | Negra et al. ............. | 423/213.5 |
| 4,003,976 A | * | 1/1977 | Komatsu et al. ......... | 423/213.5 |
| 5,130,109 A | | 7/1992 | Wan ........................ | 423/213.2 |
| 5,362,463 A | * | 11/1994 | Stiles et al. .............. | 423/239.1 |
| 5,804,152 A | | 9/1998 | Miyoshi et al. | |
| 6,022,825 A | | 2/2000 | Andersen et al. ........... | 502/303 |
| 6,308,671 B1 | | 10/2001 | Reed et al. | |
| 6,365,118 B1 | | 4/2002 | Kharas et al. | |
| 6,391,822 B1 | | 5/2002 | Dou et al. | |
| 6,407,032 B1 | | 6/2002 | Labarge et al. | |
| 6,455,463 B1 | | 9/2002 | Labarge et al. | |
| 6,464,945 B1 | | 10/2002 | Hemingway | |
| 6,489,259 B2 | | 12/2002 | LaBarge et al. | |
| 6,497,092 B1 | | 12/2002 | Theis | |
| 6,576,578 B1 | | 6/2003 | Ikuta et al. | |
| 6,592,833 B1 | | 7/2003 | Kharas | |
| 6,624,113 B2 | | 9/2003 | Labarge et al. | |
| 2003/0086851 A1 | | 5/2003 | Dou ........................ | 423/239.1 |

FOREIGN PATENT DOCUMENTS

| | | | |
|---|---|---|---|
| EP | 0625633 | 11/1994 | |
| EP | 0664147 | 7/1995 | |
| EP | 0878610 | 11/1998 | |
| EP | 0905354 | 3/1999 | |
| EP | 0931590 A1 | 7/1999 | ............ B01J/37/02 |
| EP | 0953375 | 11/1999 | |
| WO | 0043102 | 7/2000 | |

OTHER PUBLICATIONS

European Search Report for EP 01 20 4810.

* cited by examiner

Primary Examiner—M. Alexandra Elve
(74) Attorney, Agent, or Firm—Paul L. Marshall

(57) ABSTRACT

A $NO_x$ control for an exhaust is provided. The $NO_x$ control includes a nickel compound and a $NO_x$ adsorber. Systems for treating an exhaust gas are also provided, including use of a non-thermal plasma reactor and a $NO_x$ control, and optionally a particulate trap.

17 Claims, 2 Drawing Sheets

NOₓ CONTROL

TECHNICAL FIELD

The present disclosure relates to NO$_x$ controls.

BACKGROUND

The reduction of nitrogen oxide (NO$_x$), e.g., nitric oxide (NO), nitrogen dioxide (NO$_2$), and nitrous oxide (N$_2$O), in exhaust gas is a widely addressed problem as a result of environmental concerns and mandated government emissions regulations, particularly in the transportation industry. One approach uses three-way conversion catalysts to treat the exhaust gases of spark-ignited gasoline internal combustion engines for the reduction of NO$_x$ emission, since the exhaust contains minimal oxygen.

However, fuel economy and global carbon dioxide (CO$_2$) emission concerns have made it desirable to operate engines under lean-burn conditions to realize a benefit in fuel economy. Under such conditions, the exhaust streams contain excessive oxygen, and accordingly, conventional three-way conversion catalysts are generally inefficient in the reduction of nitrogen oxides. For example, a lean burn engine exhaust stream has from about 1% to 10% excess oxygen relative to the amount of fuel. Further, exhaust streams of compression-ignition engines such as diesel engines also have high oxygen content. For example, the exhaust stream may contain from perhaps about 2–20 molar % oxygen based on the total exhaust, and, in addition, contains a significant amount of particulate emissions.

Hydrocarbon (HC), particulate, or NO$_x$ emissions from an exhaust or effluent stream may be treated with a non-thermal plasma reaction in conjunction with a NO$_x$ catalyst, adsorber, or storage compound. Typically, the various NO$_x$ compounds are converted to NO$_2$, which, in the presence of HCs and water, is converted into nitrogen gas (N$_2$), oxygen gas (O$_2$), carbon dioxide (CO$_2$).

In addition to the NO$_x$, the exhaust gases typically contain sulfur compounds such as sulfur dioxide (SO$_2$) gas and particulate sulfate (SO$_4$), which are produced by the burning of sulfur contained in the fuel. The NO$_x$ catalyst oxidizes SO$_2$ to sulfur trioxide (SO$_3$) in oxygen-rich atmospheres. Still further, SO$_3$ reacts readily with water vapor, which is also contained in the exhaust gases, to produce sulfite ions and sulfate ions. The sulfite ions and sulfate ions react with the NO$_x$ catalyst to produce sulfites and sulfates. The resulting sulfites and sulfates adversely affect the NO$_x$ storage reaction. Thus, such sulfites and sulfates are commonly referred to as NO$_x$ poisons.

Therefore, as is apparent from the above brief description of NO$_x$ removal, such NO$_x$ poisons result in degraded exhaust purification. What is needed in the art is a sulfur resistant NO$_x$ catalyst.

SUMMARY

The present disclosure relates to a NOx control, a NOx reduction system, and methods for making and using the same. The NOX control includes a nickel compound in conjunction with a NOX adsorber. The nickel compound comprises about 50 wt % to about 100 wt % nickel oxide based on total weight of the nickel compound.

Further, a system for treating an exhaust gas includes a non-thermal plasma reactor and a NOX control. The NOX control includes a nickel compound in conjunction with a NOX adsorber, wherein the nickel compound comprises about 50 wt % to about 100 wt % nickel oxide based on total weight of the nickel compound.

Still further, a system may also contain a first non-thermal plasma reactor, a particulate trap, a second non-thermal plasma reactor, and a NOX control.

A method for poison protection in an engine exhaust is also provided, wherein an exhaust gas is exposed to a NOX control which includes a nickel compound in conjunction with a NOX adsorber. The exhaust gas for this method typically contains greater than about 1 molar % oxygen based on the total exhaust.

BRIEF DESCRIPTION OF THE DRAWINGS

For a further understanding of the nature of the present invention, as well as other features and advantages thereof, reference should be made to the following detailed description taken in conjunction with the accompanying drawings, which are meant to be exemplary not limiting, and wherein like elements are numbered alike in the several figures.

DESCRIPTION OF THE PREFERRED EMBODIMENT

A NOX control or a NOX adsorber system comprises a nickel or nickel oxide (NiO) component as a protective portion to minimize poisoning of the NOX active material by sulfur compounds.

Figure 1:
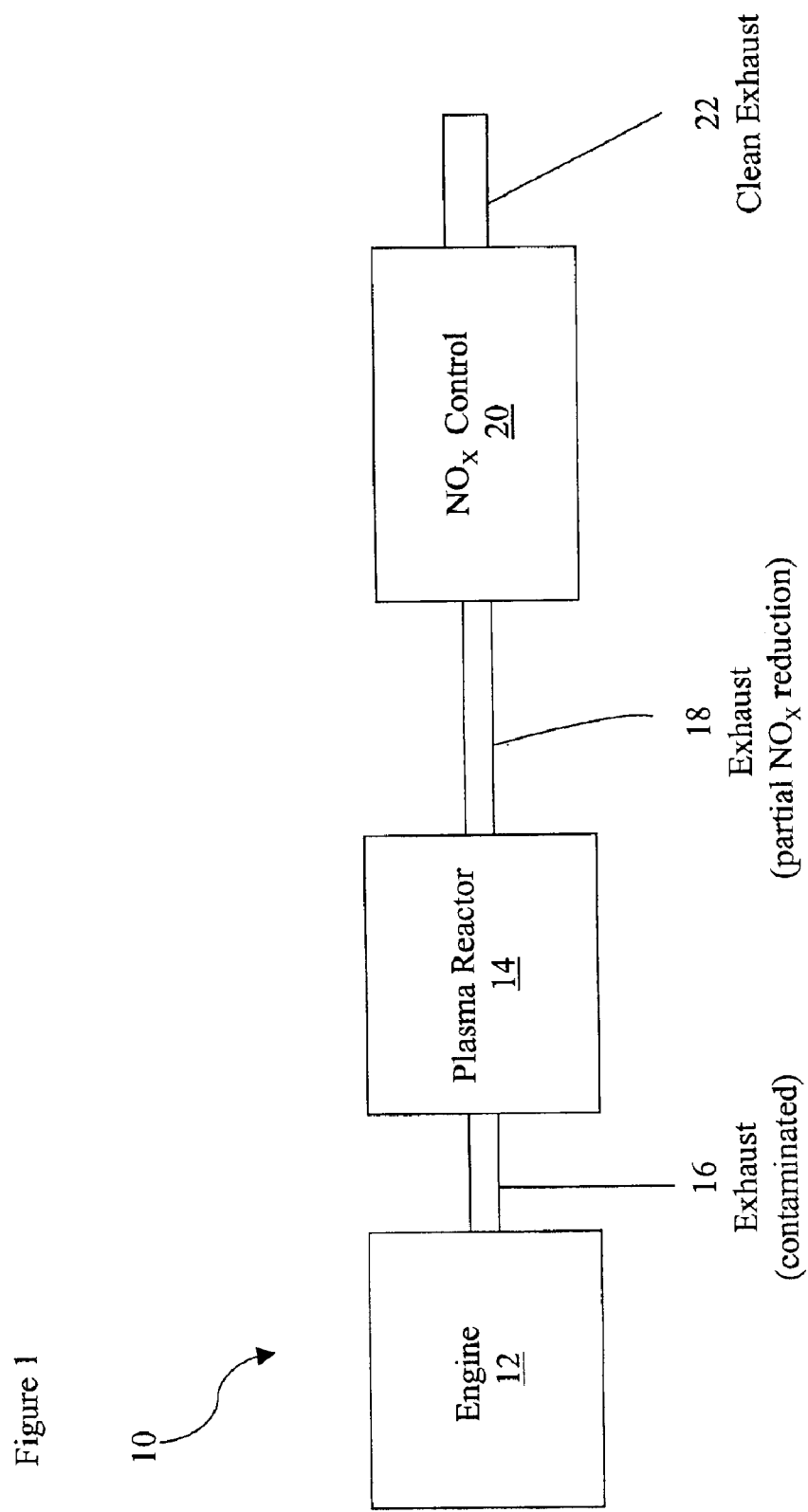
FIG. 1 is a schematic of a NOX reduction system.

Referring now to FIG. 1, a schematic of a NOX reduction system 10 is detailed. The NOX reduction system 10 includes a non-thermal plasma reactor 14 that receives a contaminated exhaust 16, for example, from a spark-ignition or compression-ignition engine 12. The contaminated exhaust typically comprises oxygen, HCs, NOX, and possibly other contaminants including, but not limited to, sulfur compounds (e.g., SO2, SO4) and particulate carbon. Under oxidizing conditions, the contaminated exhaust 16 may comprise about 1% to about 20%, or even up to about 30%, oxygen.

The non-thermal plasma reactor 14 generally converts the various NOX compounds into NO2. A partially cleaned gas stream 18 exits the plasma reactor 12 and is introduced into a NOX control 20 generally for decomposing HCs and NOX into O2, CO2, H2O, and N2 with clean exhaust 22 exiting the NOX control 20.

Plasma reactor 14 is capable of generating a potential for ionizing gasses. The plasma reactor 14 is typically connected to a power supply and comprises a system for generating a non-thermal plasma. The plasma includes a mixture of reactive free radicals, ions, and electrons that cause conversion or partial conversion of HCs, oxygen, and certain NOX compositions, as well as neutral species.

A non-thermal plasma can be generated between a pair of electrodes by a number of methods, including electrical fields, electron beams, and irradiation with electromagnetic energy of appropriate intensity and wavelength. Electrical field plasma can be generated with a high voltage (e.g., about 10,000 volts) electrical field suitable for the gas and gap geometry. A local dissociation of electrons results, and the electrons accelerate rapidly in the electrical field. The accelerating electrons strike and ionize other molecules. If the voltage is stopped before or shortly after a streamer (equivalent to the path of ionized molecules and electrons) crosses the gas gap causing an arc discharge, then a non-thermal plasma of ions and free electrons is formed. For example, oxygen gas (O2) is ionized into ozone (O3) according to the following reaction:

$$O_2 + e^- \rightarrow O_3$$

The $NO_x$ components, particularly nitric oxide, react in the presence of ozone as follows:

$$NO + O_3 \rightarrow NO_2 + O_2$$

Further, due to the ozone, some of the $SO_2$ present is converted to $SO_3$ generally as follows:

$$SO_2 + O_3 \rightarrow SO_3 + O_2$$

Certain configurations for the plasma reactor 14 include that of a dielectric barrier reactor, an electrified packed bed reactor, a glow-discharge plasma reactor, a corona discharge reactor, and other suitable plasma reactors. In the various plasma reactor types and geometries, the discharges that create the plasma originate at the surface of the electrodes at a point where the peak electric field strength is at least about five times that of the average energy field (a discharge point). Thus, preferably the reactor has a sufficient number of such discharge points positioned so as to substantially uniformly treat the target emissions in the exhaust stream.

For example, when employing a dielectric barrier reactor, e.g., plasma reactor 14, one or both electrodes are coated with a dielectric material, e.g., flat alumina plates screen printed with a dielectric such as a copper chrome alloy ink coating. During operation, a streamer is formed by an electron accelerating in the electric field, with the streamer extinguished on the surface of the dielectric material.

From the plasma reactor 14, the exhaust enters NOX control 20. NOX control 20, which is particularly suited for oxidized exhausts having oxygen content of greater than 1, 2, 5, 10, 20, or even 30 molar % based on the total exhaust (wherein oxidized exhaust comprising greater than 1% oxygen is referenced as "high oxygen content"), comprises a nickel compound and a NOX active material such as a NOX adsorber.

The nickel compound, which may comprise a brick, or a mixture such as a coating or an integral mixture on the NOX adsorber, can comprise pure nickel oxide (NiO) or a mixture, alloy, composite, or cermet of NiO and metals, metal oxides, ceramics, binders, fugitive materials, combinations thereof, and the like. Some possible materials which can be combined with the NiO include copper oxide, silver oxide, chrome oxide, as well as mixtures, alloys, composites, and cermets comprising at least one of the foregoing materials.

The nickel compound can comprise about 1 weight percent (wt. %) to about 100 wt % NiO, preferably about 50 wt % to about 100 wt % NiO, and more preferably about 80 wt % to about 100 wt % NiO, based on the total weight of the nickel compound.

The nickel compound composition is provided in various forms during manufacture, including: solid, for processes such as mixing, milling, or sintering, and the like; liquid solution, for processes such as washcoating, imbibing, impregnating, physisorbing, chemisorbing, precipitating, and the like; gaseous composition, for processes such as vapor depositing, and the like; or any combination of phases.

In one embodiment, a nickel compound coating is formed on a support material independent from the NOX active material, generally in sufficient quantity to promote reduction of NOX poisonous species. For most automotive applications, a sufficient quantity of nickel compound is about 0.125 milligrams per square centimeter (mg/cm2) to about 0.512 mg/cm2, with about 0.256 mg/cm2 to about 0.384 mg/cm2 of nickel compound preferred. The coating composition may be mixed, milled, sintered, washcoated, imbibed, impregnated, physisorbed, chemisorbed, precipitated, vapor deposited, otherwise applied, or processed by any combination of at least one of the foregoing processing techniques, integrally with the support material.

The support material can comprise any material: designed for use in a spark-ignition or compression-ignition environment (e.g., temperature of about −40° C. to about 1,000° C.; capable of withstanding exposure to HCs, nitrogen oxides, carbon monooxide, carbon dioxide, carbonaceous soot, and/or sulfur; and having sufficient surface area and structural integrity to support the desired coating composition. Preferably, the support material has a surface area up to or exceeding about 600 square meters per gram (m2/g). Some possible support materials include, but are not limited to, alumina (e.g., gamma-alumina, delta-alumina, theta-alumina, and the like), zeolite, zirconium, cerium, cesium, magnesium, titanium, silicon, cordierite, silicon carbide, porous glasses, metallic foils, mullite, alkali and alkaline-earth zirconium phosphates (NZP), and combinations, alloys, oxides, and cermets comprising at least one of these materials, among others.

Although the support materials can have any size or geometry, the size and geometry are preferably chosen to optimize surface area in the given design parameters. Suitable support materials are in the formed of mesh, corrugated foils, layered materials, spun fibers, extrudates, spheres, beads, tablets, ceramic foams, and monoliths. In one embodiment, the support material comprises a monolith (ceramic or metallic) having a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

In addition to formation on a support material, the nickel compound may be provided as a self supported structure suitable for placement within a gas stream. For example, a nickel compound may be formed into a brick or a porous compact which forms at least a portion of the NOX control 20.

Although the nickel compound is preferably employed in a NOX control 20 disposed upstream of the NOX adsorber, the nickel compound can be employed integrally with the NOX adsorber. The nickel compound may be mixed, milled, sintered, washcoated, imbibed, impregnated, physisorbed, chemisorbed, precipitated, vapor deposited, otherwise applied, or processed by any combination of at least one of the foregoing processing techniques with the NOX adsorber. Preferably, the NOX control 20 is formed by adding the nickel compound to the NOX adsorber in a manner so as not to occupy active sites intended for NOX reduction. The protective nickel compound coating acts as a poison trap, generally preventing or minimizing the possibility of sulfur and other contaminants occupying or otherwise deactivating the NOX adsorber.

The NOX adsorber may comprise one or more catalyst materials integral with a support material, such as those described above for supporting the nickel compound. Possible catalyst materials comprise those materials capable of reducing NOX to N2 and various oxygen containing compounds (e.g., CO2, H2O, and the like). For example, these catalyst materials include cesium, barium, lanthanum, silver, zirconium, zeolites, alumina, silicon, manganese, as well as alloys, oxides, and combinations comprising at least one of the foregoing materials. Further, the NOX adsorber preferably comprises a material active in an oxygen rich environment including lean burn spark-ignition engines, or compression-ignition engines such as diesel engines. Such oxygen rich environments may comprise exhaust streams including up to about 30% oxygen. Additionally, the NOX adsorber preferably comprises a material active in temperature ranges less than about 500° C., and more preferably active in temperature ranges less than about 150° C. (i.e., the light-off temperature).

Figure 2:
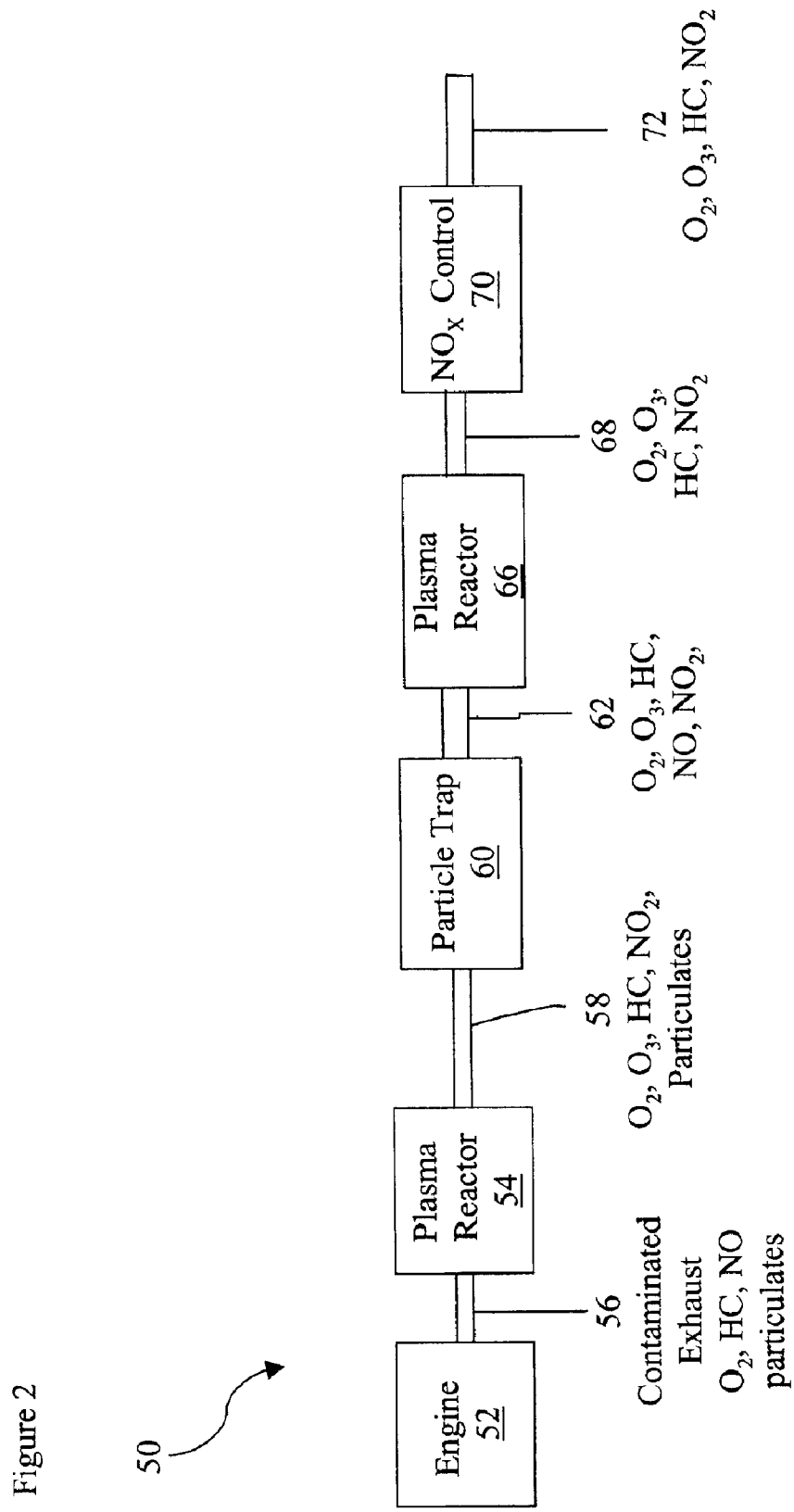
FIG. 2 is a schematic of another NOX reduction system.

Referring now to FIG. 2, a NOX reduction system 50 is detailed. The NOX reduction system 50 includes a first non-thermal plasma reactor 54 that receives a high oxygen content contaminated exhaust 56, for example, from a spark-ignition or compression-ignition engine 52. The contaminated exhaust typically comprises oxygen, HCs, NOX, and other contaminants including but not limited to sulfur compounds (e.g., SO2, SO4) and particulate carbon. The first plasma reactor 54 partially or completely converts HCs, NO to NO2, oxygen to ozone, among other ionizations, resulting in a partially cleaned exhaust 58 that is introduced to a particle trap 60. Within particle trap 60, carbonaceous and sulfate particles are trapped. Some of the carbonaceous particles react with a portion of the NO2 to form carbon monoxide (CO) and reconvert NO2 to NO, which exit in an exhaust 62. The exhaust 62, generally comprising oxygen, ozone, HCs, NO, and NO2, is fed into a second plasma reactor 66, where NO is converted to NO2. The exhaust 68, generally comprising oxygen, ozone, HCs, and NO2, is converted in a NOX control 70 to water, oxygen, molecular nitrogen, and carbon dioxide which exits NOX control 70 as clean exhaust 72.

In use, NOX compounds are converted and adsorbed in sites on the NOX adsorber. Further, the nickel compound attracts sulfur, as described further herein. Therefore, the NOX control 70 may be operatively coupled to a desorbing mechanism (not shown) for extended usage. In certain systems, the temperature levels rise sufficiently for nickel to release sulfur compounds and for NOX compounds to release from the NOX adsorber (e.g., about 500° C.), thus the NOX control 70 may passively desorb. In other systems, for example, wherein the temperature levels do not rise above 500° C., desorption may be accomplished by an active mechanism. The active desorption mechanism may comprise heat, a plasma reactor, or other suitable desorption mechanism.

EXAMPLES

The following examples illustrate specific $NO_x$ controls. It should be understood that the examples are given for the purpose of illustration and are not intended as limitations. In the examples, all parts and percentages are by weight based on the total weight of the composition unless otherwise specified.

Example 1

Zeolite with a silica to alumina ratio of 5 was triple exchanged with barium nitrate, wherein each calcining step was at 740° C. for 2 hours. The resulting mixed oxide was about 18 wt % barium. The barium-zeolite was mixed with nickel 2-ethyl hexanoate, and calcined at 500° C. The result was a stabilized barium-zeolite (Ba—$Si_2O_3/Al_2O$) encapsulated in a poison protective layer of NiO. The nickel oxide-barium-zeolite was dispersed with water containing 2 wt % nitric acid, and the resulting slurry was coated on a 600 cells per cubic inch (cell/in$^3$) cordierite monolith. The wash-coated monolith was calcined at 500° C. for 2 hours.

Example 2

Zeolite was triple exchanged with barium nitrate as in Example 1. About 80 wt % barium-zeolite was mixed with about 20 wt % nickel oxide. The nickel oxide had a surface area of at least about 100 m$^2$/g. The nickel oxide-barium-zeolite was dispersed with water containing 2 wt % nitric acid, and the resulting slurry was coated on a 600 cell/in$^3$ cordierite monolith. The wash-coated monolith was calcined at 500° C. for 2 hours.

Example 3

A first 600 cell/in$^3$ cordierite monolith of a two monolith system was coated with 100 wt % nickel oxide having a surface area of at least 100 m$^2$/g. The coated first monolith was calcined at 500° C. for 2 hours. A second 600 cell/in$^3$ cordierite monolith of the two monolith system was coated with composition of zeolite triple exchanged with barium nitrate (as in Example 1).

Example 4

A first layer of a dual layer washcoat was zeolite triple exchanged with barium nitrate as in Example 1, which was coated on a 600 cell/in$^3$ cordierite monolith. A second layer of the dual layer washcoat system was 100 wt % nickel oxide having a surface area of at least 100 m$^2$/g, which was coated over the first layer on the monolith. The dual layer washcoated monolith was calcined at 500° C. for 2 hours.

Example 5

Zeolite was triple exchanged with barium nitrate as in Example 1. The barium-zeolite was mixed with nickel 2-ethyl hexanoate. The resulting mixture was calcined at 500° C. The result was a stabilized barium-zeolite (Ba—$Si_2O_3/Al_2O_3$) encapsulated with a poison protective layer of NiO. About 70 wt % nickel oxide-barium-zeolite and 30% gamma-alumina was dispersed with water containing 2 wt % nitric acid. The resulting slurry was coated on a 600 cell/in$^3$ cordierite monolith. The wash-coated monolith was calcined at 500° C. for 2 hours.

Example 6

Zeolite was triple exchanged with barium nitrate as in Example 1. About 60 wt % barium-zeolite was mixed with 15 wt % nickel oxide having a surface area of at least 100 m$^2$/g and 25 wt % gamma alumina. The nickel oxide-barium-zeolite-alumina was dispersed with water containing 2 wt % nitric acid, and the resulting slurry was coated on a 600 cell/in$^3$ cordierite monolith. The wash-coated monolith was calcined at 500° C. for 2 hours.

Example 7

A first 600 cell/in$^3$ cordierite monolith of a two monolith system was coated with 100 wt % nickel oxide having a surface area of at least 100 m$^2$/g and calcined at 500° C. for 2 hours. A second 600 cell/in$^3$ cordierite monolith of a two monolith system was coated with 75 wt % barium-zeolite and 25 wt % gamma alumina. The monolith was calcined at 500° C. for 2 hours.

Example 8

A first layer of a dual layer washcoat included 75 wt % zeolite and 25 wt % alumina, which was coated on a 600 cell/in$^3$ cordierite monolith. The coated monolith was calcined at 500° C. for 2 hours. A second layer of a dual layer washcoat system included 100 wt % nickel oxide having a surface area of at least 100 m²/g that was coated over the first layer on the monolith. The dual layer washcoated monolith was calcined at 500° C. for 2 hours.

Example 9

Barium oxide was mixed with nickel 2-ethyl hexanoate, and calcined at 500° C. The result was barium oxide encapsulated with a poison protective layer of NiO. The nickel oxide-barium oxide was dispersed with water containing 2 wt % nitric acid, and the resulting slurry was coated on a 600 cell/in³ cordierite monolith. The wash-coated monolith was calcined at 700° C. for 2 hours.

Example 10

About 80 wt % barium oxide was mixed with 20 wt % nickel oxide having a surface area of at least 100 m²/g. The nickel oxide-barium-oxide was dispersed with water containing 2 wt % nitric acid, and the resulting slurry was coated on a 600 cell/in³ cordierite monolith. The wash-coated monolith was calcined at 700° C. for 2 hours.

Example 11

A first 600 cell/in³ cordierite monolith of a two monolith system was coated with 100 wt % nickel oxide having a surface area of at least 100 m²/g. The coated first monolith was calcined at 500° C. for 2 hours. The second 600 cell/in³ cordierite monolith of the two monolith system included 100 wt % barium oxide. The coated second monolith was calcined at 740° C. for 2 hours.

Example 12

A first layer of a dual layer washcoat comprising 100 wt % barium oxide was coated on a 600 cell/in³ cordierite monolith. The coated monolith was calcined at 740° C. for 2 hours. A second layer of a dual layer washcoat system included 100 wt % nickel oxide having a surface area of at least 100 m²/g that was coated over the first layer on the monolith. The dual layer washcoated monolith was calcined at 500° C. for 2 hours.

In a typical system not including the nickel composition poison trap (e.g., a $NO_x$ catalyst system include barium impregnated zeolite), in oxygen rich environments, barium oxide is formed, which generally reacts with $NO_2$ to form barium nitrate, as follows:

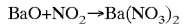

Barium nitrate reacts with the existing HCs, resulting in water, elemental nitrogen, and carbon dioxide as follows:

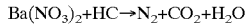

However, in the presence of sulfur trioxide ($SO_3$), barium oxide also typically reacts to form barium sulfate:

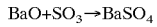

The formation of barium sulfate ($BaSO_4$) is typically irreversible in systems operating at less than about 500° C. Thus, the $NO_x$ activity correspondingly decreases.

The inclusion of the nickel compound poison trap causes the sulfur trioxide to react with nickel (or NiO), rather than the barium (or other catalyst) composition. The nickel compositions used preferably have a strong affinity for sulfates. Particularly, NiO reacts readily with sulfur trioxide, which is generally formed due to reaction of ozone and sulfur dioxide as described above. Sulfur trioxide is reacted as follows at the nickel coating trap:

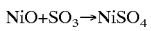

In exhaust systems that have a low oxygen content (e.g., less than about 1 molar % based on the total exhaust), nickel compounds are typically avoided or used in small quantities, e.g., less than about 2 wt. %. The lack of oxygen causes adverse poisoning of the $NO_x$ adsorber. Generally, in neutral or reducing conditions, the nickel oxide will minimally release trapped sulfur. Also, in high temperature environments, the high temperature will decrease the active surface area of the nickel oxide, but the benefits of the nickel oxide described herein are essentially unaffected up to about 800° C. Higher temperatures will further cause irreversible formation of $NiAl_2O_4$ or other inactive compounds. Furthermore, use of nickel compounds with conversion catalysts employing precious metals such as platinum, palladium, and rhodium may coat the surface of the precious metal, thus such usage is preferably minimized to reduce waste of such precious metal compounds.

Consequently, nickel compounds, provided either separate from or in combination with a support or a catalyst, provides several benefits to typical exhaust systems. One primary benefit is the trapping of poisons (i.e., constituents that may be detrimental to the life of the catalysts or that may bypass catalyst conversion) such as phosphorous, sulfur, halogens, silicon, and other poisons. Further, nickel compounds, particularly NiO, may have $NO_x$ reduction activity; may facilitate organic decomposition by dehydrogenating organics (e.g., dehydrogenating butane to more reactive organics such as butene) and by cracking heavy organics into more reactive lighter organics; and may reduce the amount of sulfated particulates.

While preferred embodiments have been shown and described, various modifications and substitutions may be made thereto without departing from the spirit and scope of the invention. Accordingly, it is to be understood that the system and method have been described by way of illustration only, and such illustration and embodiments as have been disclosed herein are not to be construed as limiting to the claims.

What is claimed is:

1. A $NO_x$ control, comprising:
   a nickel compound comprising about 50 wt % to about 100 wt % nickel oxide based on total weight of the nickel compound; and
   a $NO_x$ adsorber,
   wherein said nickel compound is a coating on said NOx adsorber.

2. The $NO_x$ control as in claim 1, wherein said nickel compound comprises about 80 wt % to about 100 wt % nickel oxide based on total weight of the nickel compound.

3. The $NO_x$ control as in claim 1, wherein said nickel compound comprises both a coating on said $NO_x$ adsorber and particulates dispersed with said $NO_x$ adsorber.

4. The $NO_x$ control as in claim 1, wherein said nickel compound is disposed on a first support, and said $NO_x$ adsorber is disposed on a second support.

5. The $NO_x$ control as in claim 4, wherein said nickel compound disposed upstream from said $NO_x$ adsorber.

6. The $NO_x$ control as in claim 1, wherein said nickel compound is as a self-supported structure, and wherein said $NO_x$ adsorber is disposed on a support, said support being independent from said structure.

7. The $NO_x$ control as in claim 1, wherein said $NO_x$ adsorber comprises a catalyst material and a support, said catalyst material selected from the group consisting of cesium, barium, lanthanum, silver, zirconium, and alloys, oxides, and combinations comprising at least one of the foregoing catalyst materials.

8. The NOx control as in claim 7, wherein said support comprises a zeolite.

9. The NOx control as in claim 8, wherein said support further comprises alumina.

10. The NOx control, comprising:
   a zeolite ion exchanged with a material selected from the group consisting of barium, cesium, lanthanum, silver, and combinations comprising at least one of the foregoing materials; and
   a nickel compound coating on the zeolite, wherein said nickel compound comprises about 50 wt % to about 100 wt % nickel oxide based on total weight of said nickel compound.

11. The NOx control as in claim 10, wherein said nickel compound comprises about 80 wt % to about 100 wt % nickel oxide based on total weight of said nickel compound.

12. The NOx control as in claim 10, wherein said nickel compound is present in an amount of 15 wt % to 50 wt %, based upon the combined weight of said nickel compound and said zeolite.

13. The NOx control as in claim 10, further comprising alumina.

14. The NOx control as in claim 1, wherein said nickel compound is present in an amount of 15 wt % to 50 wt %, based upon the combined weight of said nickel compound and said NOx adsorber.

15. The NOx control as in claim 1, wherein said NOx adsorber further comprises a zeolite.

16. The $NO_x$ control as in claim 7, wherein said catalyst material selected from the group consisting of cesium, barium, and combinations comprising at least one of the foregoing catalyst materials.

17. The NOx control as in claim 1, wherein the nickel compound further comprises a material selected from the group consisting of silver oxide, chrome oxide, and combinations comprising at least one of the foregoing materials.

* * * * *